United States Patent [19]

Monford, Jr.

[11] Patent Number: 5,070,964

[45] Date of Patent: Dec. 10, 1991

[54] END EFFECTOR WITH ASTRONAUT FOOT RESTRAINT

[75] Inventor: Leo G. Monford, Jr., Dickinson, Tex.

[73] Assignee: The United States of America as represented by the Administrator of the National Aeronautics and Space Administration, Washington, D.C.

[21] Appl. No.: 664,008

[22] Filed: Mar. 4, 1991

[51] Int. Cl.⁵ .............................................. B66F 11/04
[52] U.S. Cl. .......................................... 182/63; 182/2; 182/129; 182/134; 182/141
[58] Field of Search ................... 182/2, 134, 129, 230, 182/63, 141; 248/176

[56] References Cited

U.S. PATENT DOCUMENTS

| | | | |
|---|---|---|---|
| 1,918,293 | 7/1933 | Seiler | 182/134 |
| 2,211,088 | 4/1940 | Arnold | 254/7 |
| 3,043,394 | 7/1962 | Hall | 182/2 |
| 3,146,853 | 9/1964 | Eckels | 182/46 |
| 3,153,510 | 10/1964 | Brannfors et al. | 239/286 |
| 3,286,855 | 11/1966 | Bill | 214/3 |
| 3,470,980 | 10/1969 | Irwin | 182/2 |
| 3,741,143 | 6/1973 | McKinley | 182/2 |
| 4,105,239 | 8/1978 | Akczinski, Sr. | 294/65.5 |
| 4,109,480 | 8/1978 | Sumner | 182/2 |
| 4,287,459 | 9/1981 | Dahlstrom | 318/568 |
| 4,431,081 | 2/1984 | Gagnon | 182/134 |
| 4,685,535 | 8/1987 | Bush et al. | 182/63 |
| 4,760,985 | 8/1988 | Stewart et al. | 248/176 |
| 4,921,292 | 5/1990 | Harwell et al. | 294/65.5 |

Primary Examiner—Reinaldo P. Machado
Attorney, Agent, or Firm—Hardie R. Barr; Harold W. Adams; Edward K. Fein

[57] ABSTRACT

The combination 10 of a foot restraint platform 12 designed primarily for use by an astronaut being rigidly and permanently attached to an end effector 14 which is suitable for attachment to the manipulator arm 16 of a remote manipulating system. The foot restraint platform, is attached by a brace 36 to the end effector 14 at a location away from the grappling interface of the end effector. The platform comprises a support plate 18 provided with a pair of stirrups 21,22 for receiving the toe portion of an astronaut's boots when standing on the platform and a pair of heel retainers 23,24 in the form of raised members which are fixed to the surface of the platform and located to provide abutment surfaces for abutting engagement with the heels of the astronaut's boots when his toes are in the stirrups. The heel retainers 23,24 preclude a backward sliding movement of the feet on the platform and instead require a lifting of the heels in order to extract the feet. The brace 36 for attaching the foot restraint platform to the end effector may includes a pivot or swivel joint to permit various orientations of the platform with respect to the end effector.

6 Claims, 4 Drawing Sheets

1

END EFFECTOR WITH ASTRONAUT FOOT RESTRAINT

ORIGIN OF THE INVENTION

The invention described herein was made by an employee of the United States of America for governmental purposes without the payment of any royalties thereon or therefor.

FIELD OF THE INVENTION

This invention relates to the field of mobile work platforms and more particularly to a foot restraint platform which may be rigidly fixed to an end effector on the arm of a remote manipulator system, such as the Remote Manipulator System (RMS) included in the Space Shuttle Orbiter.

BACKGROUND OF THE INVENTION

The extracurricular activity of astronauts in the weightless environment of extraterrestrial space presents many problems for which conventional mobile work platforms and associated remote manipulator systems are unsuited. Many extravehicular activities of astronauts require a work platform with foot restraints and tethers. However, if the remote manipulator system is grappled to the foot restraint platform, it is not usable for anything else. A different means of mounting the platform to the manipulator arm is therefore desirable.

Heretofore, the extravehicular activity of an astronaut in the weightless environment has been required in the installation of a foot restraint platform to the arm of a remote manipulator system. Aside from the burdensome effort, time and expense required for the installation, no effective means is available to the astronaut when on the platform for storage and retention of equipment and tools to be used in the performance of designated tasks. Foot restraint platforms on a structure fixed to the arm of a remote manipulator system associated with a spacecraft are shown in U.S. Pat. No. 4,685,535. A foot restraint platform attached to a frame structure which is extended or deployed from a space vehicle is also disclosed in U.S. Pat. No. 4,760,985. In both these prior art devices, the installation of the foot restraint platforms is achieved by the astronaut during his extravehicular activity. While means for storage of special equipment such as strut assemblies is disclosed in U.S. Pat. No. 4,760,985, a very specialized and complex mechanism is required which can be used for few other purposes. Furthermore, the installation of the storage means itself, requires the extravehicular activity of an astronaut.

SUMMARY OF THE INVENTION

The invention is a combination of a foot restraint platform rigidly attached to an end effector which suitable for attachment to the manipulator arm of a remote manipulating system. The foot restraint platform, which is attached by a rigid brace to the end effector away from the grappling interface of the end effector, is designed primarily for use by an astronaut. The platform is provided with a pair of stirrups which are adapted to receive the toe portions of an astronaut's boots when the astronaut is standing on the platform and a pair of heel retainers in the form of raised members which are fixed to the surface of the platform and are located to provide abutment surfaces for abutting engagement with the heels of the astronaut's boots when his toes are in the stirrups. The heel retainers preclude backward sliding movement of the feet on the platform to accomplish an extraction from the stirrups and therefore require a lifting of the heels in order to extract the feet. The attachment of the foot restraint platform to the end effector may include a pivot or swivel joint to permit an adjustment of the orientation of the platform with respect to the end effector.

DETAILED DESCRIPTION OF THE INVENTION

Figure 1:
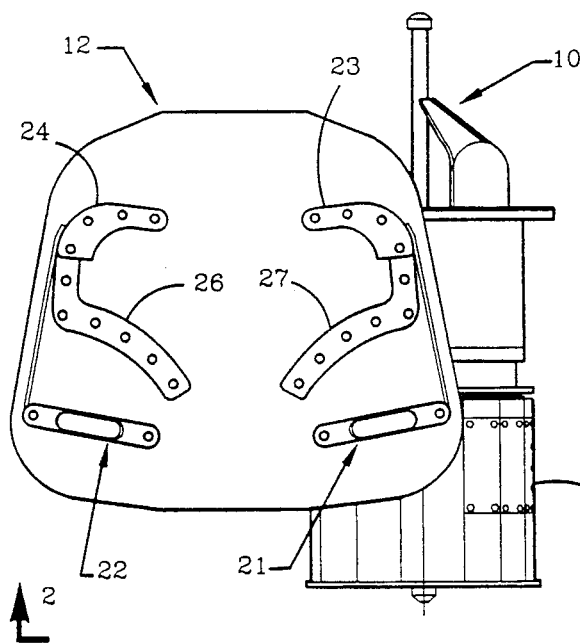
FIG. 1 is a top plan view of a foot restraint platform in attached position on an end effector designed for attachment to the arm of a remote manipulator system.
Figure 2:
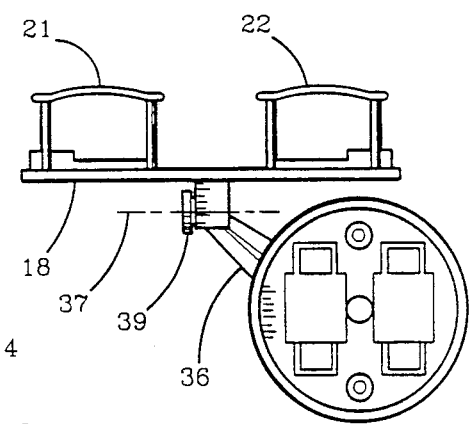
FIG. 2 is a side view of the foot restraint platform and end effector as taken along the line 2—2 of FIG. 1.
Figure 3:
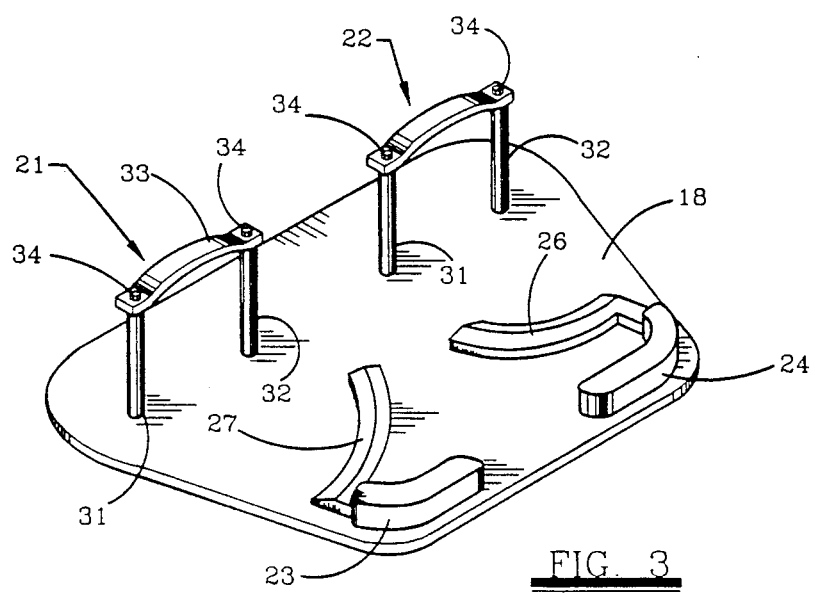
FIG. 3 is a perspective view, in isolation, of the foot restraint platform of FIG. 1.
Figure 4:
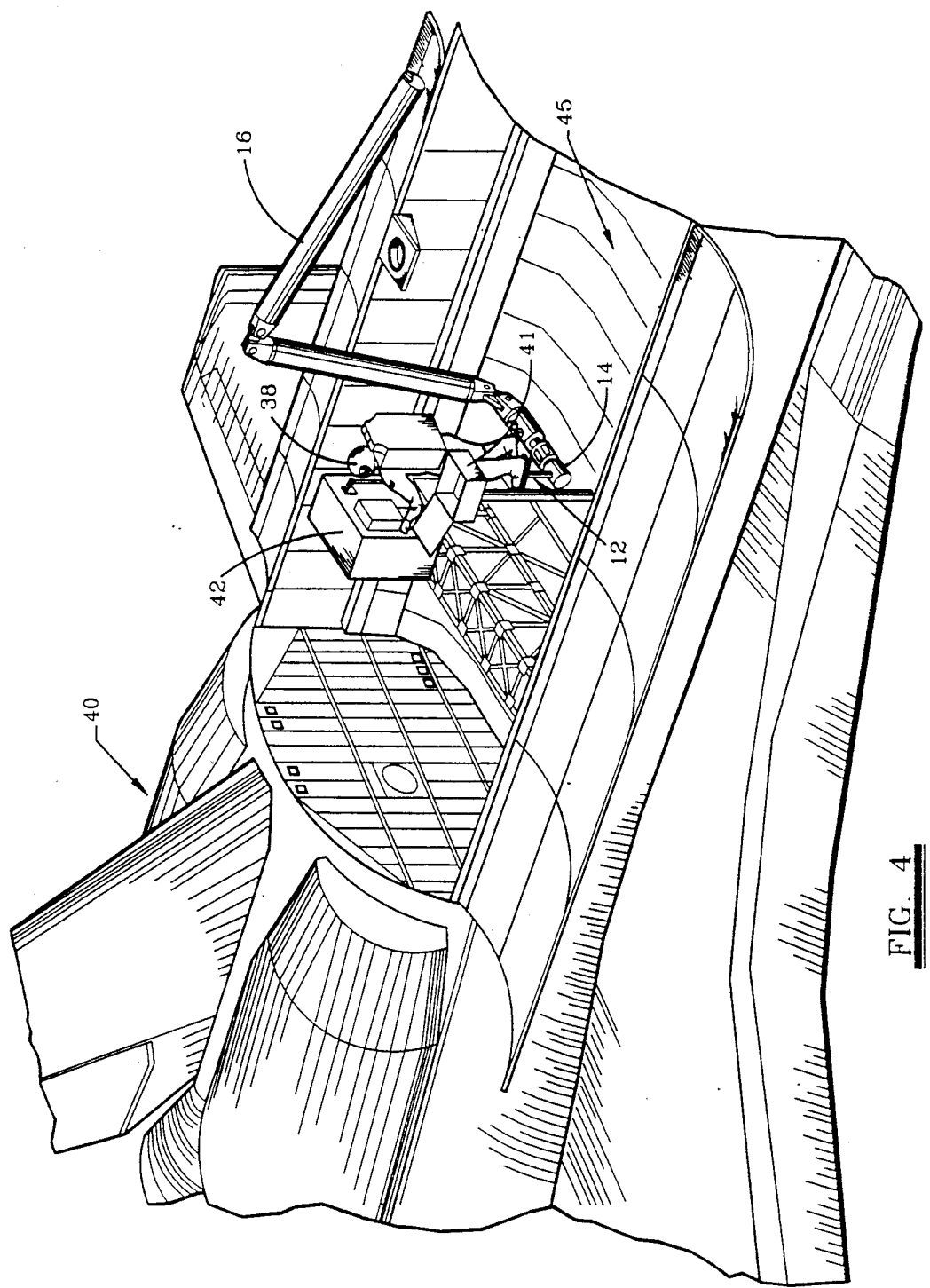
FIG. 4 is a perspective view illustrating an application of the invention wherein an astronaut works from the foot restraint platform of the invention with the end effector component attached to the arm of a remote manipulator system and in the condition of being grappled to a special purpose tool box.
Figure 5:
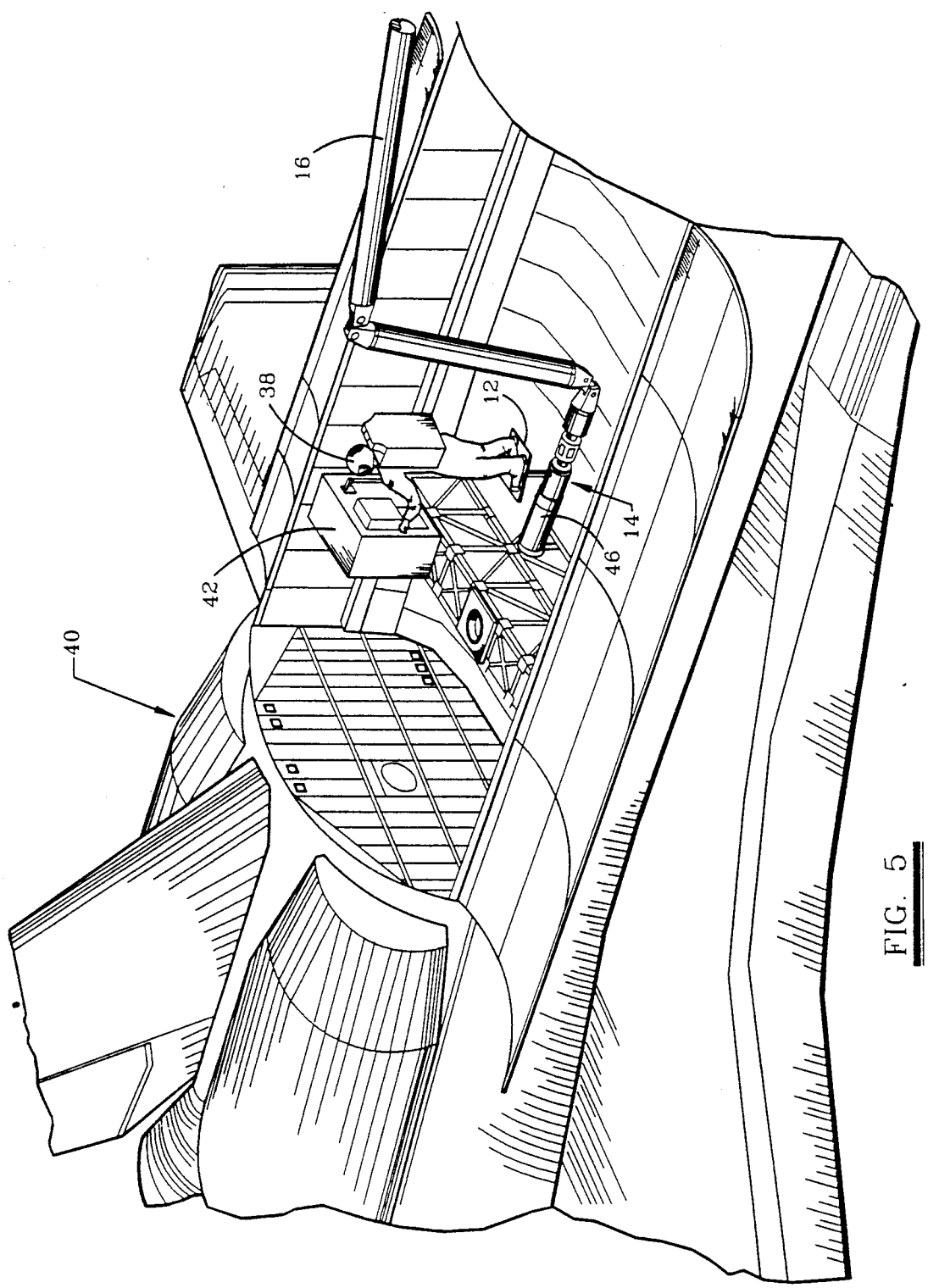
FIG. 5 is a perspective view of the invention, similar to FIG. 4, but showing the end effector component grappled to a rigid structure mounted in the open bay of a space vehicle.
Figure 6:
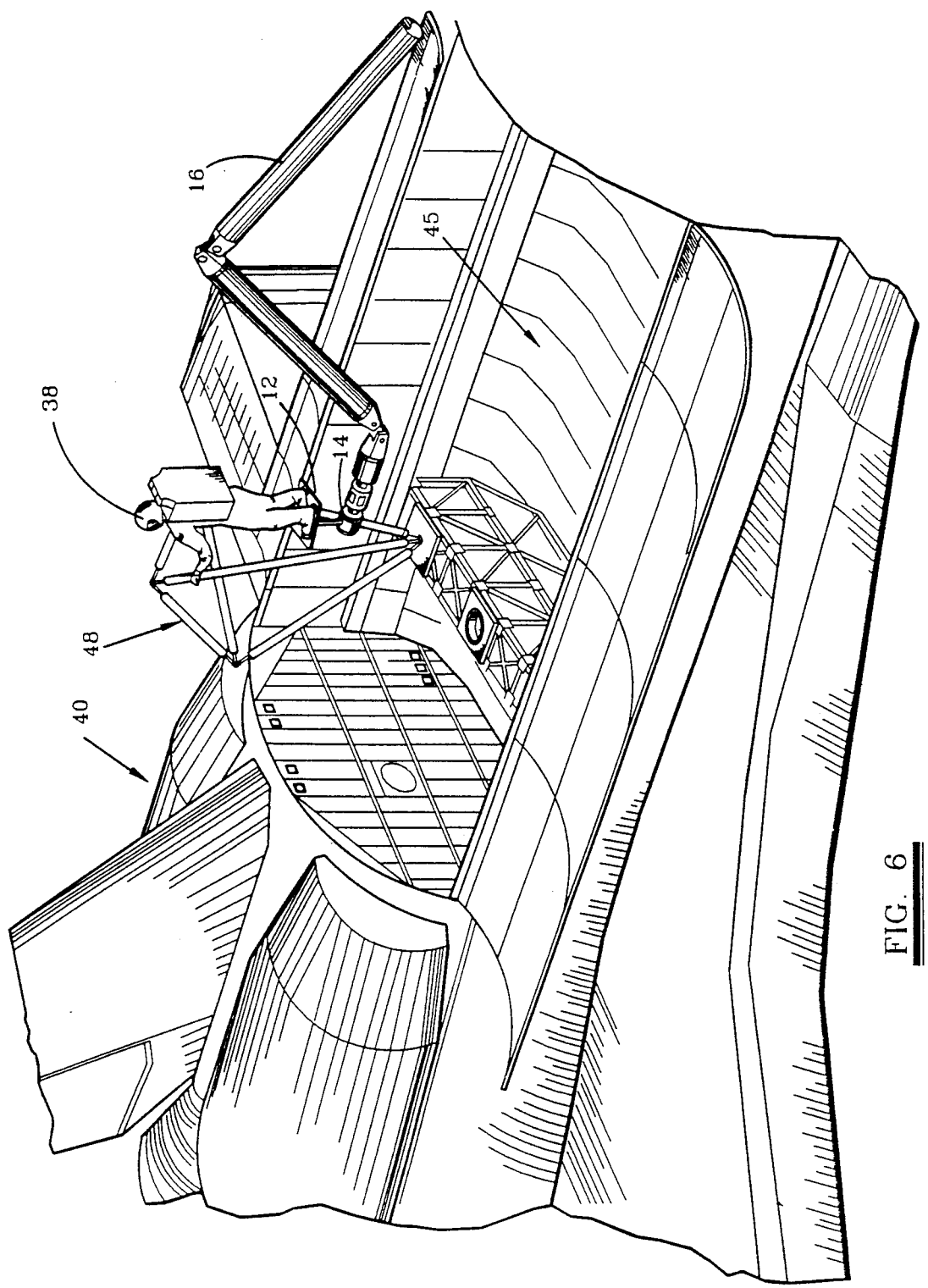
FIG. 6 is a perspective view illustrating an application of the invention wherein an astronaut is working from the foot restraint platform of the invention with the end effector component of the invention is in a non-grappling condition.

Referring more particularly to the drawings, there is shown in FIGS. 1 and 2 in a preferred embodiment, the combination 10 of a foot restraint platform 12 mounted to the side of an end effector 14. The end effector 14 is adapted for attachment to the end of the manipulator arm 16 (FIG. 4) of a remote manipulator system, and most particularly a remote manipulator system as is carried in the cargo bay of a space vehicle, as shown in FIGS. 4–6. The end effector 14 may be any of a variety of end effectors. A magnetic attachment mechanism of the type which incorporates permanent magnets for producing grappling forces as shown in U.S. Pat. No. 4,921,292 could be used. However, a preferred end effector is one which includes electromagnets for creating a magnetic field attractive force for grappling as disclosed in co-pending patent application Ser. No. 07/636,531.

The foot restraint platform 12 comprises a rigid support plate 18 with foot stirrups 21,22 and heel retainers 23,24, mounted thereon. The foot stirrups 21,22, which are adapted to receive the toe portions of the shoes or boots of a person standing on the support plate 18, are preferably rigid structures, each comprised of a pair of spaced upright tubular posts 31,32 with a metallic cross strap 33 secured to the tops of the posts 31,32, as by bolts 34. The posts 31,32 may be welded to the support plate 18 or attached thereto by bolts, such as by extended versions of the bolts 34 which may be made sufficiently long to extend through the full length of the posts 31,32 and through the support plate 18. The heel retainers 23,24 are fixed in place near the rear edge 35 of the plate 18 by rivets, welding or other suitable bonding means in positions such that they serve to preclude the astronaut's feet from sliding out of the stirrups 21,22 unless the astronaut should lift his heels from the plate 18.

In addition, a pair of raised foot guides 26,27 are fastened to the plate 18. The foot guide 26 is provide for the right foot and extends from the heel retainer 24 with a portion curved inwardly under the arch. The guide 27 is similarly designed to extend under the arch of the left foot. The guides 26,27 are of slightly lower elevation than the heel retainers and serve to permit some pivotal movement of the feet outwardly of the heel retainers while maintaining a degree of retention.

The foot restraint platform 12 is attached to the exterior side wall of the end effector 14 by an angle brace 36 and is mounted thereon such that the support plate 18 resides in a plane which is in non-intersecting, generally tangential relationship with respect to the circular cross section of the end effector 14. However, in some applications, it may be desirable that the plate 18 be positioned in a different relationship with the end effector and for this purpose a pivot or swivel joint might be provided in the brace 36, such as a joint for movement about a pivot axis, such as an axis 37, and an appropriate clamp 39 for maintaining the joint in a desired clamped condition.

It will therefore be seen that an end effector 14 with a foot restraint platform 12 attached thereto in the manner described above is still free to grapple other objects, such as a tool box or rigid structure.

In FIG. 4, the combination of a foot restraint platform 12 mounted to the side of a magnetic end effector 14 is shown as positioned at a selected work site for an astronaut 38 engaged in a particular extravehicular activity. The end effector 14 is attached to the end of the manipulator 16 of a remote manipulator system of a type which may be carried aboard a space vehicle 40. In the application shown in FIG. 4, the magnetic end effector is grappled to a special purpose tool box 41 in an orientation such that the tool box with tools and equipment carried therein is located close to the side of the astronaut when standing on the foot restraint platform 12 with his feet in the stirrups 21,22. By operation of the remote manipulator system as controlled from the space vehicle, the astronaut is carried on the foot restraint platform to a position closely adjacent a space structure or apparatus 42 on which the astronaut will perform a designated task. The apparatus 42 is shown located in the open cargo bay 45 of the space vehicle 40, although it could be deployed therefrom with the space vehicle maneuvered in close proximity.

In FIG. 5, the magnetic end effector 14 and foot restraint platform 12 with astronaut 38 standing thereon are shown positioned by the manipulator arm 16 in close proximity to the space apparatus 42 with the magnetic end effector directly grappled to a grappling fixture 46 on the apparatus 42. The grappling fixture 46 will typically include a ferrous strike plate and the tractive force between the magnets and the ferrous strike on the apparatus 42 stabilizes the end effector 14 and the astronaut at the work station.

In FIG. 6, there is depicted an application of the invention wherein the foot restraint platform 12 with an astronaut 38 standing thereon is positioned at a work site in proximity to a specialized space equipment 48 mounted in the cargo bay 45 of the space vehicle 40. The astronaut works from the foot restraint 12, positioned by the remote manipulator system. In this application while the end effector 14 is not grappled to any stabilizing structure, the astronaut has the benefit of an end effector which is available for supportive tasks.

It is to be appreciated therefore, that the invention disclosed herein, which comprises a foot restraint platform rigidly mounted on an end effector, will greatly increase the efficiency and effectiveness of the person carried thereon, particularly in extraterrestrial applications where the invention is mounted on the end of the manipulator arm of a remote manipulator system designed for operation in a zero gravity space environment. In the applications of the invention illustrated in FIGS. 4-6, the astronaut may be supplied with his own maneuvering apparatus or he may be supplied with tethers in conventional manner.

It is also to be noted that the foot restraints provided by the stirrups 21,22, heel retainers 23,24 and foot guides 26,27 are not such as severely restrict a person's capability of extracting his feet from the platform represented by the support plate 18. On the other hand, an inadvertent extraction is likely to be precluded. A conscious effort of lifting the heels and swiveling away from the heel retainers before sliding the feet from the stirrups 21,22 will most often be required for extraction. In some instances releasable straps might also be provided.

It is therefore to be understood that the foregoing description of a preferred embodiment of the invention has been presented for purposes of illustration and explanation and is not intended to limit the invention to the precise form disclosed: For example, flexible strap loops might be provided in lieu of the rigid stirrups 21,22. The end effector 14 may assume forms and principles of operation other than requiring magnets for providing a grappling force. It is to be appreciated therefore that various material and structural changes may be made by those skilled in the art without departing from the spirit of the invention.

What is claimed is:

1. A mobile foot restraint platform for astronauts comprising in combination,
   an end effector designed for attachment to the distal end of the manipulator arm of a remote manipulating system;
   a platform adapted to support an astronaut in standing position thereon, said platform being provided with foot restraint mechanisms thereon; and
   means for rigidly mounting said platform to said end effector at a location which does not interfere with the grappling interface of the end effector.

2. A mobile foot restraint platform as set forth in claim 1 wherein said end effector is an end effector having magnets for creating a magnetic attractive force as a grappling force.

3. A mobile foot restraint platform as set forth in claim 1 wherein the foot restraints on said platform are provided by a pair of inverted "U"-shaped members, each having legs thereof rigidly mounted to said platform in upright position thereon and spaced relative to the other "U"-shaped member in a manner suitable for receiving the toe portions of an astronaut's boots when the astronaut is standing on the platform, said foot restraints further including a pair of heel retainers mounted on said platform at locations adapted to be engaged by the heels of an astronaut's boots when the toe portions of his boots are received in said stirrups to thereby preclude a retraction of the boots from the stirrups by a backward sliding movement on said platform without lifting of the heels from the surface of the platform.

4. A mobile foot restraint platform as set forth in claim 3 wherein said platform is attached to said end effector by a brace which includes an adjustable pivot joint therein for adjusting the relative orientation of the platform with respect to the end effector.

5. A mobile foot restraint platform as set forth in claim 4 wherein said end effector includes an electromagnet for providing a magnetic field as an attractive force for grappling purposes.

6. The method of attaching a foot restraint platform to an end effector mounted on the end of the manipulator arm of a remote manipulator system for use by an astronaut in the weightless environment of space, said method comprising:

attaching a platform by a rigid brace to the end effector at a location different from the grappling interface of the end effector;

providing the platform with a pair of stirrups which are adapted to receive the toe portions of an astronaut's boots when the astronaut is standing on the platform;

providing a pair of heel retainers for said platform wherein the heel retainers are in the form of raised members fixed to the surface of the platform in a location thereon so as to provide abutment surfaces for abutting engagement with the heels of the astronauts boots when the astronaut's toes are in the stirrups so as to preclude backward sliding of the feet on the platform and require lifting of the heels from the platform surface for accomplishing extraction of the feet from the stirrups, said end effector thereby being freed for the grappling of the objects.

* * * * *